June 19, 1956  G. S. PETERSON ET AL  2,751,257
CONVEYANCE OF GRANULAR SOLIDS
Filed June 9, 1951  2 Sheets-Sheet 1
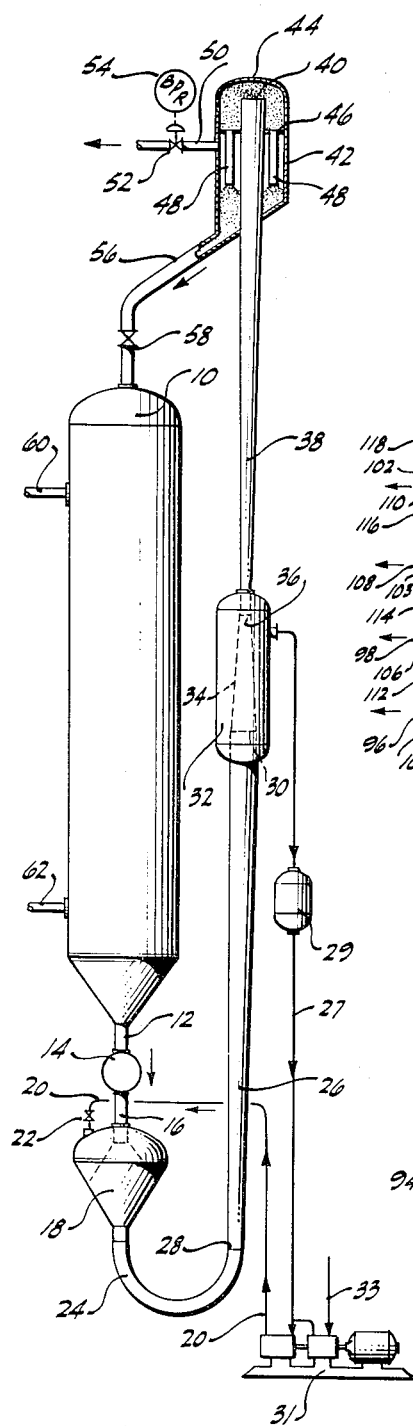
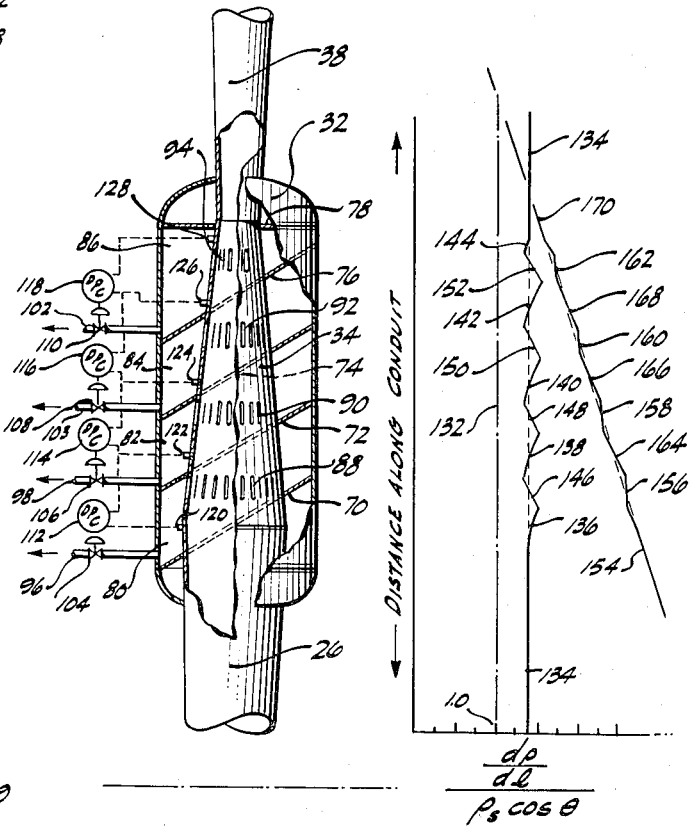
INVENTORS.
GALE S. PETERSON,
CHARLES J. WELSH,
BY
AGENT.

June 19, 1956  G. S. PETERSON ET AL  2,751,257
CONVEYANCE OF GRANULAR SOLIDS

Filed June 9, 1951  2 Sheets-Sheet 2

INVENTORS
GALE S. PETERSON,
CHARLES J. WELSH,
BY
AGENT.

United States Patent Office 2,751,257
Patented June 19, 1956

2,751,257

CONVEYANCE OF GRANULAR SOLIDS

Gale S. Peterson, Long Beach, and Charles J. Welsh, Orange, Calif., assignors to Union Oil Company of California, Los Angeles, Calif., a corporation of California Application June 9, 1951, Serial No. 230,802

22 Claims. (Cl. 302—17)

This invention relates to improvement in operations involving the movement of granular solids such as in the contacting of gases or vapors with moving granular adsorbents or catalysts. More particularly this invention relates to an improved process and apparatus for handling or conveying the granular solids in such a continuous contacting process or any other operation in which granular solids are to be conveyed. Specifically this invention relates to an improved method and apparatus for the conveying of granular solids in substantially compact form, that is, the granular solids move as a compact porous mass of granular solids having substantially the same bulk density as the settled compacted granular solids do when at rest and unaerated. The granular solids are conveyed through an elongated conduit under the influence of a depressuring conveyance fluid moving concurrently with the solids.

The movement of granular solids in appreciably large quantities presents a technical problem in many industrial operations such as the movement of cracking catalysts in the well-known T. C. C. and fluid cracking processes, the conveyance of sand from tar sand retorting processes, the movement of ores and coal in metallurgical operations, and in many other industrial processes in which large quantities of granular solids are employed. Problems are encountered particularly when granular solids must be transported continuously at high volumetric flow rates, or under pressure, or under conditions where losses of the solids due to attrition or abrasion must be minimized to prevent an economic disadvantage. Such conditions are pronounced in the transportation of expensive granular catalysts which are required to be circulated at rates of as high as 800 to 1,000 tons per hour as, for example, in large scale catalytic cracking processes employing high catalyst-to-oil ratios.

Conventionally granular solids are conveyed by moving mechanical equipment such as bucket elevators, the various forms of belt conveyors, and other apparatus such as open or enclosed drag lines. For atmospheric pressure operations such mechanical equipment adequately serves to transport the granular solids at moderate rates. However, when the solids are desirably transported at high flow rates, or in connection with processes in which fluids under pressure contact the granular solids, or in processes where the attrition loss of granular solids must be kept at a minimum, numerous disadvantages of such mechanical conveyances present themselves. Among these problems is the size of the equipment necessary to transport large quantities of granular solids. For example, bucket elevators necessary to transport cracking catalyst at a rate of about 150 tons per hour are approximately 4 feet in length, 1 foot in width, and 1½ feet deep. Furthermore, the maintenance of the necessary driving mechanism at temperatures of the order of those in the cracking processes is difficult and expensive. The quantity of granular solids lost by attrition in loading and unloading the buckets is frequently excessive.

It is therefore an object of the present invention to provide an improved method for the conveyance of granular solids through relatively small sized equipment at relatively high volumetric flow rates without the disadvantages inherent in moving mechanical conveyors.

It is an additional object of this invention to provide a method for the conveyance of granular solids in which no moving mechanical equipment is employed and the conveyance is effected by a depressuring concurrent flow of a conveyance fluid through a conduit carrying the granular solids in substantially compact form.

Another object of this invention is to provide a conveyance conduit adapted to the movement of granular solids maintained in a substantially compact form in which compensation is made for velocity increases of the concurrently depressuring conveyance fluid to maintain a substantially constant pressure drop per unit length of the conduit.

A more specific object of this invention is to provide a transition zone for the removal of at least part of the conveyance fluid from at least one point along the length thereof simultaneously with a change in the cross-sectional area of the conduit in order to maintain a constant conveying force therein.

A more specific object of this invention is to provide a conveyance conduit consisting of at least two diverging portions of increasing cross-sectional area in the flow direction separated by a converging foraminate transition section in which the cross-sectional area decreases in the flow direction and from which transition section at least one and preferably a plurality of streams of conveyance fluid is removed whereby a constant conveyance force is maintained throughout all portions of the conveyance conduit including the transition section.

It is an additional object of the present invention to provide an apparatus capable of effecting the aforementioned objects.

Other objects and advantages of the present invention will become apparent to those skilled in the art as the description thereof proceeds.

Briefly, the present invention comprises an improved solids conveyance process wherein the granular solids are introduced into an elongated conveyance zone, are conveyed therethrough by means of a concurrently depressuring conveyance fluid, and are maintained during conveyance in substantially compact form. (The condition of granular solids designated as "substantially compact form" is hereinafter more specifically defined or described in connection with tests for determining the existence or non-existence of such condition.) The depressuring conveyance fluid flowing through the interstices of the porous granular moving mass generates a pressure gradient throughout the mass in the direction of solids and fluid flow which, if sufficient in magnitude, causes solids motion by overcoming opposing forces of gravity and friction. The ratio of the force of the pressure gradient to the opposing gravitational force existing in the conveyance zone is called the conveyance force ratio and is given by $$\frac{\frac{dp}{dl}}{\rho_s \cos \theta} \qquad (1)$$

wherein $$\frac{dp}{dl}$$

is the pressure gradient along the length of the conveyance zone in pounds per square foot per foot, $\rho_s$ is the bulk density of the granular solids in pounds per cubic foot, and $\theta$ is the angular deviation of the conveyance zone from a vertical axis. (Other consistent units may be substituted.) This ratio is 1.0 when the conveyance force is equal to the opposing gravitational force acting along the axis of the conveyance zone. Thus a vertical conveyance zone requires a greater pressure gradient than a sloping or a horizontal conveyance zone. These theoretical minimum values must be exceeded to overcome friction forces to cause solids motion. Usually the ratio in typical conveyance zones in accordance with this invention is between about 1.01 and about 2.0. For maximum conveyance efficiency the ratio is maintained substantially constant through the conveyance zone, preferably at the lowest values at which friction also is overcome by means described below.

The conveyance fluid may be liquid or gaseous. A consideration of the coefficient of expansion of the particular fluid employed is necessary in order that a constant conveyance force ratio be maintained throughout the conveyance zone. When liquid fluids are used or gaseous fluids are employed under conditions wherein the total pressure drop through the conveyance zone is less than about 5 per cent of the absolute pressure, the expansion of the conveyance fluid is generally insufficient to require special means for maintaining a constant conveyance force ratio. In the other cases when gaseous fluids are used with a pressure drop exceeding about 5 per cent of the absolute pressure, the expansion of the fluid causes substantial fluid velocity changes which result in the similar variations of the conveyance force ratio within the conveyance zone.

An additional factor must be considered in the maintenance of constant force ratios which is dependent upon the contribution (upon pressure decrease) of part of the conveyance fluid present in the void spaces or interstices of the solids to that part of the conveyance fluid which is considered to be flowing through the interstices of the granular solids. That is, the mass of conveyance fluid present in the interstices of the solids is greater at the line inlet than at the outlet. Thus, not only does expansion of the flowing conveyance fluid cause changes in the conveyance fluid velocity and the force ratio but also the expansion of conveyance fluid carried in the void spaces between individual particles has a contributing effect.

In order to compensate for these and other factors it has been found that by increasing the cross-sectional area of the conveyance zone in the direction of solids flow a constant conveyance force ratio may be maintained. For flows of gaseous fluids it has been found that the taper of the conveyance zone, or the change in cross-sectional area with distance from its inlet, required to maintain a constant force ratio is correlated by the following equation:

$$\frac{A_2}{A_1} = \frac{1}{A_1}\left(\frac{aQ}{\rho_s}\right)\left(\frac{m.w.}{RT}\right)^{1-\frac{1}{n}}(P_1-P_2)\left(\frac{C}{P_2\frac{dp}{dl}}\right)^{\frac{1}{n}} + \left(\frac{P_1}{P_2}\right)^{\frac{1}{n}} \quad (2)$$

wherein $a$ is the void fraction of the bulk of the solids; no units
A cross-sectional area of conduit; square feet
C permeability constant as determined from:

$$\frac{dp}{dl} = C\rho^{n-1}V^n$$

wherein $\frac{dp}{dl}$ is pressure gradient; pounds per square foot per foot, $\rho$ is the fluid density; pounds per cubic foot,
V superficial gas velocity; feet per second,
$n$ exponent; 1.0 for viscous flow and 1.85 for turbulent flow
m. m. molecular weight of conveyance fluid
P pressure in conduit; pounds per square foot Q solids flow rate; pounds per second
R gas constant; 1543 foot pounds per °R per pound mol
T temperature; °R=460+°F.
$\rho_s$ bulk density of solids; pounds per cubic foot
1 subscript; reference to inlet of conduit section considered
2 subscript; reference to outlet of conduit section considered (Other consistent units may be substituted.)

Therefore by employing the above correlation to design a line for conveyance under certain specific conditions where the distance of conveyance and the characteristics of the solids are known, the change in pressure (which is linear) can be calculated knowing that $$\frac{\frac{dp}{dl}}{\rho_s \cos\theta} > 1.0 \quad (3)$$

for example, equals 1.1. The value of $A_1$ is determinable from well-known correlations of the rates of gravity flow of granular solids from orifices of various cross-sectional areas, an area capable of delivering the required flow rate under gravity flow being adequate in the present apparatus. From the required solids delivery rate the cross-sectional area $A_1$ is selected. The solids delivery rate Q is known and the void fraction $a$, the bulk density of the solids $\rho_s$, and the solids permeability factor C are determined from the granular solids physical characteristics by experimentation. $P_2$ is the desired line outlet pressure and $P_1$ is estimated from the length of the line and from a known value of the conveyance force ratio, for example a value of 1.1. The reverse procedure is permissible, i. e. the estimation of $P_2$ from a known $P_1$. Using Equation 2 and the foregoing data, values of $A_2$ are determined over the entire line. Preferably a design is effected by considering successive lengths of the conveyance zone, but an estimation of the taper may be made by a similar calculation for the entire length of the conveyance zone.

From the foregoing, the variation in cross-sectional area of a conduit may be determined in which the conveyance force ratio is maintained at a constant value both with time and with position within the conveyance conduit. A conduit constructed to conform to the calculations described above is tapered to provide the precise change in cross-sectional area. The change in cross-sectional area may be very closely approximated, however, by interconnecting a plurality of cylindrical conduits having regular cross-sections in which each successive section has a larger transverse cross-sectional area than the preceding portion of the line. The uniformly tapered modification is preferred and is easily fabricated from conduits of regular cross-section by cutting a long V-shaped section from the conduit and welding the conduit closed to form a conduit of the desired area change.

In long conveyance conduits, that is those rising in a vertical direction more than about 50 feet and those extending longer than about 250 feet in a horizontal direction, the diameter of the conduit adjacent its outlet opening may become as much as 300% of the inlet diameter of the conduit and while such a conduit is perfectly operable the quantity of material contained in the line and the weight of material required to construct such a conduit may be inadvisable.

It has been found according to the present invention that a reduction in the cross-sectional area of the conveyance conduit may be obtained without directing the flow of granular solids out of the axis of the conveyance conduit or away from the general flow direction through which the granular solids are to be conveyed and thus limit the maximum diameter of the conveyance conduit. Further, this reduction in cross-sectional area is established simultaneously with a removal of a controlled portion of the conveyance fluid flowing and a maintenance of a substantially constant conveyance force ratio even through this transition section. The advantages thus obtained are very material since the quantity of material required to construct the conveyance conduit is hereby reduced to an absolute minimum, the distance through which the solids are conveyed is likewise reduced, and as subsequently illustrated the horsepower requirement is also reduced. The conveyance conduit therefore, according to the present invention, takes the form of a plurality of conduits, each of increasing cross-sectional area in the flow direction in accordance with Equation 2 and interconnected by a plurality of transition sections in which are provided means for withdrawal of a portion of the conveyance fluid and in which the cross-sectional area decreases in the flow direction.

The apparatus for carrying out the present invention will be more clearly understood by reference to the accompanying drawings in which:

Figure 1 shows generally the specific conveyance apparatus of the present invention employed for the recirculation of granular solids through one or more contacting columns;

Figure 2 shows an elevation view in partial cross-section of the transition zone section;

Figure 3 shows a cross-section transverse view through the transition section;

Figure 4 indicates the variation in conveyance force ratio and conveyance fluid pressure throughout the transition section;

Figure 5 shows an elevation view in cross-section of a second modification of the transition section;

Figure 6 indicates a detailed view of a cross-section of the transition section;

Figure 7 indicates an elevation view of one part of the transition section indicating the detail of the control mechanism; and Figures 8 and 9 show an elevation and cross-sectional views of a third modification.

Referring now more particularly to Figure 1, granular solids are withdrawn from contacting column 10 or other vessel by means of transfer line 12. They are then passed through pressuring means 14 which comprises a pressuring pot system or a continuous solids pressuring feeder such as one of the improved types of vane feeder presently available. The granular solids under increased pressure subsequently flow via line 16 into induction chamber 18 into which a conveyance fluid under elevated pressure is introduced via line 20 at a rate controlled by valve 22. The granular solids flow by gravity from induction section 18 into redirection section 24 concurrently with depressuring conveyance fluid into the lower inlet opening 28 of primary conveyance conduit 26. The cross-sectional area of the primary conveyance conduit increases in the direction of solids flow from a minimum area at its inlet 28 to a maximum area at its outlet 30 within transition section chamber 32. Within the latter-named chamber a transition section 34 of the conduit connects the outlet area 30 of the primary conveyance conduit with the reduced area of inlet 36 of secondary conveyance conduit 38. The nature and construction of the transition section will be subsequently described in detail. Secondary conveyance conduit 38 increases in cross-sectional area and has a discharge opening 40 established in the upper portion of separator chamber 42 within which the depressured conveyance fluid is separated from the granular solids conveyed through the conveyance conduit. Outlet opening 40 of secondary conveyance conduit 38 is established within from 0.2 and 2.0 outlet opening diameters from dome 44 of separator chamber 42 in order that a restrictive force may thereby be applied to the granular solids discharging from outlet opening 40 and thus maintain the granular solids throughout the conveyance system in substantially compact form. If desired, a separate thrust plate may be positioned at this distance from opening 40. A transverse plate 46 provided with dependent tubes 48 is established in separator chamber 42 in the annular volume surrounding the upper portion of secondary conveyance conduit 38. The granular solids flow downwardly by gravity through tubes 48 and the depressured conveyance fluid is removed from the annular volume surrounding tubes 48 by means of line 50 at a rate controlled by valve 52 in conjunction with back pressure regulator 54. The granular solids thus conveyed pass by gravity through transfer line 56 which may, in another modification of the present invention, contain the pressuring device 14 instead of positioning it within transfer line 12 as described above. The granular solids flow through valve 58 into the upper portion of contacting column 10.

Partially depressured conveyance fluid is removed from the transition section chamber 32 via line 27 and passed through dust removal and cooling means 29. The clean cool fluid is then returned to an interstage point in compressor 31. Fresh conveyance fluid which may be conveyed from separator 42 is introduced via line 33 for compression. Compressed fluid passes via line 20 to induction chamber 18. Multistage compressors are ordinarily employed and the location of the transition section chambers along the length of the conveyance conduit is conveniently based upon a consideration of these interstage pressures as well as on the maximum tolerable conduit diameter.

The nature of contacting column 10 varies according to the particular process which is to be carried out. Inlet and outlet conduits 60 and 62 and others if needed are provided for the introduction and removal of fluids to contact the granular solids within the column. In the several variations of the present invention granular catalysts may be employed to contact fluid reactants in such hydrocarbon conversion operations as catalytic cracking, desulfurization, alkylation, reforming, coking, isomerization of hydrocarbons, and catalytic reactions with other fluids to be treated. It also may be applied to the contacting, heating or cooling of fluids to effect such solids reactions such as lime burning, ore oxidation in the well-known ore roasting processes, the heating of oil shales and tar sands for the recovery of hydrocarbons, and the heating or cooling of fluids by direct solids contact and any other operation in general in which the contact of a moving bed of granular solids with a fluid, whether liquid or gaseous, is required.

In another modification of the present invention granular solids are removed from contacting column 10 and conveyed by the means described above into another contacting column not shown for further treatment therein and subsequently returned to column 10. As an example of this type of operation the catalytic cracking of hydrocarbons may be cited in which one column is employed for the contacting of hydrocarbon vapor with a catalyst and the other contacting column is employed for regeneration of the spent catalyst by means of suitable regeneration fluids. Granular solids are conveyed from the bottom of the second contacting column to the top of the first contacting column by means of a second conveyance conduit which is entirely analogous to the one described in Figure 1.

Referring now more particularly to Figure 2, one modification of the transition section in the conveyance conduit according to this invention is shown. The enlarged upper portion of primary conveyance conduit 26 and the lower portion of secondary conveyance conduit 38 are shown interconnected by means of transition section 34. Surrounding this section is fluid-tight transition section chamber 32 containing a plurality of sloping dividers 70, 72, 74, 76, and 78 spaced apart from one another within the annular volume between the chamber 32 and transition section 34. Between each pair of dividers are thus formed fluid collection zones 80, 82, 84, and 86. Opening through the wall of the transition section into each of the respective gas or fluid collection zones is a plurality of openings 88, 90, 92, and 94. These openings in the present modification preferably comprise longitudinal slots which have a greater width on the outside surface of the transition section than they do on the inside surface thereof. Preferably the ratio of the outside width to the inside width is between 1.25 and 3.0. Preferably the ratio of the inside width of each slot to the diameter of the smallest desirably retained particle of granular solids conveyed is maintained between values of 0.1 and 0.75. Thus the flow of conveyance fluid from the fluid removal zones in the transition section through the slots is permitted and the flow of granular solids therethrough, except solids fines, is prevented. The flow of fines through the slots is not impeded but it is a desirable means for removing such fines when undesired from the granular solids during conveyance. If desired, a double sloping baffle below each series of slots within each fluid removal zone may be established as subsequently shown in Figure 5 for the collection of such fines and their removal with the depressured conveyance fluid.

From adjacent the lowest point in each of the fluid collection zones is provided a fluid draw-off line 96, 98, 100, and 102, each provided with a separator for fines separation (not shown, but conventional) and a flow control valve 104, 106, 108, and 110 respectively which are operated respectively by differential pressure controllers 112, 114, 116, and 118. These differential pressure controllers are actuated by the differential pressure existing across each fluid removal zone in the transition section opposite each of the respective fluid collection zones. Pressure taps 120, 122, 124, 126, and 128 are provided for this purpose. Depending upon the distance between the pressure taps, a corresponding differential pressure is dictated by the desired conveyance force ratio of Equation 1 to be maintained. The differential pressure controller is therefore set to throttle its associated flow control valve to maintain this differential pressure throughout each zone of the transition section.

The operation of the device of the present invention therefore involves the passage of granular solids from primary conveyance conduit 26 having an enlarged cross-sectional area near its outlet successively through the fluid draw-off zones of the transition section in which the cross-sectional area decreases to the entrance area of secondary conveyance conduit 38. Since such a decreasing cross-sectional area tends to increase the fluid and solids velocity and consequently the pressure drop and therefore the conveyance force ratio, a portion of the conveyance fluid is withdrawn through the slots previously described thereby successively reducing the superfiical fluid velocity through each of the successive fluid removal zones of the transition section. Hereby a substantially constant conveyance force ratio throughout the transition section is maintained thereby establishing a substantially constant conveyance force ratio throughout the entire conveyance conduit. The conveyance fluid remaining in the transition section after removal of the last portion via slots 94 depressures concurrently with the granular solids in compact form through secondary conveyance conduit 38.

In Figure 3 a transverse view of the device of Figure 2 is shown in which transition section chamber 32 and the transition section 34 are shown. Slots 94 (for example) are shown having a greater outside width than inside width. Granular solids 130 having diameters appreciably greater than the inside width of the slots are also shown.

Referring to Figure 4, a plot is shown indicating the changes in conveyance fluid pressure and the conveyance force ratio with distance along the length of a typical conveyance conduit including the transition section. Line 132 indicates the minimum value of conveyance force ratio of 1.0 which is a critical limitation in the operation of the present invention. Line 134 indicates a design value for a typical operation having a value of about 1.35. The variations in conveyance force ratio shown in line 134 consist of a series of increases and decreases in the conveyance force ratio as the granular solids pass through the transition section. The increasing portions 136, 138, 140, and 142 and 144 result from the decrease in the cross-sectional area of the transition section between the slotted portions. This causes the velocity of the conveyance fluid to increase slightly, causing the increases in force ratio noted. The decreases 146, 148, 150, and 152 are due to the removal of a part of the conveyance fluid through slots 88, 90, 92, and 94 described. These increases and decreases average over the length of the transition section at a value of substantially 1.35, which is a typical desired value in the present modification.

Also shown in Figure 4 is a curve 154 showing the decrease in conveyance fluid pressure through the transition section and parts of the adjacent conveyance conduit. The decrease in pressure with distance is directly calculable for a given conveyance force ratio from the conveyance force ratio of Equation 1. Throughout the transition section it is noted that the pressure decreases at higher and lower rates than the general decrease characteristic of the conveyance conduit. Sections 156, 158, 160, and 162 are portions in which the pressure decrease is low due to the fact that a part of the conveyance fluid is being removed from the slots described. Sections 164, 166, 168, and 170 are those sections in which a somewhat higher pressure drop is experienced due to the flow of conveyance fluid through those parts of the transition section in which the slots are not maintained. This increased rate of pressure drop occurs in the same sections as does the rising conveyance force ratio described above.

Referring now more particularly to Figure 5, again the upper portion of primary conveyance conduit 26 and the lower portion of secondary conveyance conduit 38 are shown interconnected by means of transition section 34 contained within transition section chamber 32 as in Figure 2. Again slots 88, 90, 92, and 94 are shown along the length of the transition section but each is provided in this modification with a movable collar 180, 182, 184, and 186. These collars are supported on stationary collars 181, 183, 185, and 187 and are rotatable. They are provided with triangular openings 188, 190, 192, and 194 whereby, upon rotation of each collar, a greater or lesser length of the slot will be uncovered and thus open for the flow of conveyance fluid from the slots in the particular draw-off zone. A sloping baffle 196 is provided in the lower portion of chamber 32 by means of which the fines are withdrawn from the chamber by means of one or more lines 198 controlled by valves 200. Depressured conveyance fluid flowing through the open portion of the slots and accumulating in the annular volume surrounding the transition section is removed therefrom via line 202 at a rate controlled by back pressure regulator or a flow control instrument 204.

The change in conveyance force ratio and conveyance fluid pressure through this modification of the transition section is substantially the same as that shown in Figure 4 for the first modification described in conjunction with Figure 2.

Pressure taps 206, 208, 210, 212, and 214 are provided whereby a pair of pressure taps embraces each draw-off zone in the transition section. In turn these pressure taps actuate differential pressure controllers 216, 218, 220, and 224 in a manner analogous to that described in connection with Figure 2. The differential pressure controller instruments in this modification, however, directly actuate the rotatable collars referred to and thus increase or decrease the degree of opening of the slots through which the conveyance fluid is withdrawn. Hereby a greater or less quantity of conveyance fluid is withdrawn for each successive plurality of slots. Upon adjusting the differential pressure controllers to maintain a certain differential pressure as described above in connection with Figure 2, the instrument then adjusts the cross-sectional area which is open for conveyance fluid withdrawal through each set of longitudinal slots in order to withdraw a sufficient portion of conveyance fluid in order to maintain the desired conveyance force ratio and compensate for the decrease in area of the transition section. In another modification the rotatable collars are manually set to give the desired pressure gradient in the transition section.

Referring now to Figure 6, a transverse view in cross-section of this modification of transition section is shown, showing the transition section chamber 32, the transition section 34, and rotatable collar 186 as an example of the plurality of collars shown in Figure 5. The triangular openings 194 are indicated as are slots 212. These slots are also wedge-shaped, having a smaller width on the inside surface than on the outside surface of the transition section. To allow for thermal expansion, the collar is fabricated in two or more sections linked together by means of connecting rod 230 provided with springs 232. A pivoted link 234 is provided whereby actuating rod 236 passing through packing gland 238 may rotate collar 186 about the longitudinal axis of the transition section. A valve headworks 240 actuated by means of differential pressure controller 224 as shown in Figure 5 acts to change the rotative relation between the collar and the slots thereby varying the cross-sectional area open to conveyance fluid withdrawal.

In Figure 7 an external elevation view of the collar showing the slots and triangular openings is indicated in detail. A portion of the transition section 34 is shown with a rotatable collar 242 provided with four triangular openings 244, 246, 248, and 250, being provided along with stationary support collar 243. With reference to triangular opening 246, it is noted that slot 252 is substantially one-half uncovered to allow for passage therethrough of conveyance fluid.

Two modifications of transition section have been described above to effect the process of the present invention. In the first, the slots opening into each fluid draw-off zone are of constant cross-sectional area and the flow rate therethrough is controlled by controlling the differential pressure existing across the slots. In the modification shown in Figure 5 the cross-sectional area of the orifice, that is the slots, is controlled to vary the flow rate of conveyance fluid at a substantially constant pressure differential.

Referring now to Figure 8, a third modification of the transition section is shown in which a series of sets of slots are provided along the length of the transition section in which the slots are proportioned in number and area to allow the removal of the required quantity of conveyance fluid throughout the length of the transition section to maintain a substantially constant conveyance force ratio. Again the upper portion of primary conveyance conduit 26 and the lower portion of secondary conveyance conduit 38 are shown connected by transition section 34 contained within chamber 32. A sloping baffle 250 is provided adjacent the bottom of chamber 32 in the annular volume together with outlet line 252 controlled by valve 254 for the removal of solids fines. If desirable these may be removed with the fluid drawn off as indicated in Figure 2. Outlet conduit 256 provided with flow control valve 258 actuated by back pressure regulator or flow controller 260 is provided to maintain a predetermined fluid pressure within the annular volume of chamber 32. Slots provided along the length of the transition section are arranged in four sets; the first set 262 provided with 3 slots, the second set 264 provided with 5 slots, third set 266 having 6 slots and fourth set 268 having 7 slots.

Knowing the outlet and inlet pressures of the conveyance fluid in the transition section and the desired conveyance force ratio which is to be maintained constant throughout the length thereof, Equation 1 indicates the pressures existing along the transition section. The quantity of conveyance fluid flowing with the granular solids into the transition section is known and from this figure and the pressure existing within the transition section at the draw-off point the cross-sectional slot area of each of the series of sets of slots may be calculated from established orifice equations to establish the requisite withdrawal of conveyance fluid at the particular pressure differential through each of the series of slots. Thus the quantity of conveyance fluid flowing through the transition section in the direction of solids flow is reduced by draw-off to maintain a substantially constant conveyance force ratio therein.

In Figure 9 is indicated a plurality of transverse views in cross-section of the transition section showing the slots milled in the wall of the transition section.

Example I

As an example of the latter design the following data are given relative to the conveyance of 500 tons per hour of synthetic bead cracking catalyst through a conveyance conduit according to this invention 106.2 feet in height. The conduit is provided with a primary conveyance conduit 61.06 feet in length, increasing in inside diameter from 15 inches to 24 inches, opening into a transition section 10 feet in length. The transition section decreases in inside diameter from 24 inches to 15 inches and opens into a secondary conveyance conduit 35.15 feet in length which increases in inside diameter from 15 inches to 24 inches. The design conveyance force ratio is 1.50 and the quantity of conveyance fluid required is 901 S. C. F. M. (standard cubic feet per minute). The annular volume of the transition section chamber is maintained at a pressure of 30.0 lbs./sq. in. absolute. The inlet pressure is 61.5 p. s. i. a. and the outlet pressure is 14.7 p. s. i. a. A total quantity of conveyance fluid amounting to 402 S. C. F. M. is removed from the transition section chamber and 499 S. C. F. M. are discharged from the outlet of the secondary conveyance conduit. To maintain a constant conveyance force ratio of 1.5 throughout the transition section five sets of slots are maintained along the length of the transition section having a minimum width of 0.03125 inch. The first set consists of 3 slots spaced 120° apart around the periphery of the transition section and are 7.5625 inches in length. The second set consists of 4 slots spaced 90° apart which are 6.375 inches in length. The third set consists of 4 slots similarly spaced and are 6.5625 inches in length. The fourth set consists of 4 slots 7½ inches in length and the fifth set consists of 6 slots spaced 60° apart and which are 7.1875 inches in length. The individual flow rates of conveyance fluid withdrawn through each of these five sets of slots decrease in the direction of solids flow so that 94, 90, 80, 72, and 66 S. C. F. M. of conveyance fluid flow respectively through the five sets of slots. A total of 402 S. C. F. M. are thus removed. The pressure at the inlet of the transition section is 34.6 p. s. i. a. and the pressure in the outlet of the transition section is 30.2 p. s. i. a.

The horsepower required to operate the conveyance conduit just described is 103, which includes recompression of the 402 S. C. F. M. of partially depressured conveyance fluid withdrawn from the transition section chamber. The weight of the conveyance device is 5,420 pounds.

Example II

As a comparison with similar characteristics of another conduit handling the same quantity of solids but which does not include the transition section according to this invention, the following data are given. The conveyance conduit is 106.2 feet in length, has an inlet diameter of 15 inches and an outlet diameter of 35 inches. It is seen that the outlet diameter is 50% greater than that of the previous example. The conduit has an increasing cross-sectional area for maintaining a substantially constant conveyance force ratio of 1.5. A total quantity of conveyance fluid amounting to 901 standard cubic feet per minute is required and the horsepower requirement is 134, substantially 30% greater. The weight of the conduit is 6,950 pounds compared with 5,420 pounds for the improved conveyance conduit of this invention. This is a 28% increase in weight.

In the modifications shown in Figures 2, 5, and 8, four sets of slots are shown in the transition section. This, however, is not to be understood as a limitation of the present invention since as few as one set and as many as 8 or 10 or more sets may be employed to achieve a greater or less degree of uniformity in the conveyance force ratio throughout the length of the transition section. Thus, in Figure 4 it is obvious that with 8 sets of fluid draw-off slots the deviations in conveyance force ratio from the design value shown in line 134 will be decreased so that a more nearly constant conveyance force ratio is attainable. The actual number employed in any given instance therefore depends upon mechanical considerations in the particular conveyance operation at hand. It is, however, preferred that sufficient draw-off zones be provided so that the conveyance force ratio does not vary more than 10% of its design value, that is for example a design ratio of 1.25 may rise to a value of 1.375 and decrease to a value of 1.125 and still be operable. The maximum conveyance efficiency, however, is obtained when a completely uniform conveyance force ratio is established throughout the entire length of the conveyance conduit including the transition sections.

In Figure 1 a single transition section is shown connecting a pair of tapered conveyance conduits. It is within the scope of the present invention to employ 2, 3 or more such transition sections in conveyance conduits where the length of such conveyance necessitates their incorporation. Preferably a transition section is established within the conveyance conduit when the diameter of the conduit increase to about 200% of the inlet diameter of that section of the conveyance conduit or in non-circular conveyance conduits when the cross-sectional area increases to about 400% of the inlet cross-sectional area. For example, a transition section is installed in a conveyance conduit having an inlet diameter of 4 inches at the point where the design calculations indicate that the diameter must have increased to a value of 8 inches to maintain the design conveyance force ratio. A transition section having an inlet diameter of 8 inches and an outlet diameter of 4 inches is then installed to conduct granular solids from the first section into the second section of conveyance conduit wherein the cross-sectional area is increased to manitain the force ratio. Should design calculations indicate that the fluid pressure in the conveyance conduit reach a value equal to an interstage pressure of the compressor, the transition section is preferably placed at this point even through the areal increase has not reached the 200% figure given. Additional transition sections are provided depending upon the required length of conveyance.

Preferably the degree of taper in the transition section is such as to minimize attrition effects due to the decrease in the open cross-sectional area for solids flow. This is established by providing that the length of the transition section be between about 2 and 20 times the major dimension across the inlet to the transition section and preferably between 5 and 10 times this dimension. For example, a transition section having an inlet diameter of 8 inches may be made a length of between 16 inches and 160 inches in length or preferably this length is between 40 inches and 80 inches in length.

In the present specification the term "substantially compact form" is intended to indicate a mass of solids having an operating bulk density which is substantially the same as the vibrational static bulk density of the solids determined when at rest and in the absence of moving fluids. To determine whether or not the solids in a conveyance line or any portion thereof are moving in substantially compact form, resort may be had to any one of the following methods, which involve determination of bulk densities directly, or differential pressures, or changes in differential pressures with changes in flow rate of the conveyance fluid. The first method to be discussed involves direct measurement of bulk densities.

The usual determination of the bulk density of granular solids is made in a vessel of known volume by applying vibrational forces to a known mass of solid granules. It is indicated that the moving solids in the apparatus of this invention are in the form of a continuous porous mass having an operating bulk density which is substantially the same as this vibrational bulk density.

The granular solids are conveyed in this state by means of a conveyance fluid depressuring through the substantially compact moving mass of granular solids so that substantially no fluidization or aeration or expansion of the porous mass of solids occurs to change the bulk density of the moving mass from this value.

It is recognized that the bulk density of a mass of granular solids is not always constant, but varies with the geometry of the particle arrangement. For example, a given mass of uniform spherical granules will have the least bulk density when systematically packed with particle centers coinciding with the corners of a cube (cubic packing—pore volume 47.64% [1]) and the greatest bulk density (about 41.5% greater) when uniformly packed with particle centers coinciding with the apexes of a tetrahedron (rhombohedral packing—pore volume 25.95% [1]). The bulk density of solids during conveyance according to this invention is intermediate between the bulk densities of solids uniformly packed according to the foregoing systems and is apparently a random mixture of several packing geometries. Similar density variations occur in packings of nonuniform and irregular particles.

In the conveyance system of the present invention such differences in packing arrangement apparently exist but they rarely if ever cause the bulk density of the moving solids to decrease more than 20% of the at-rest vibrational packed value and usually the decrease does not exceed about 5% of this value.

To illustrate the magnitude of the solids bulk density variation the following data are given typical of an operation for conveying compact solids:

| | |
|---|---|
| Conduit height, feet | 27.25 |
| Conduit attitude | Vertical |
| Conduit diameter, inches: | |
|    Inlet | 3.068 |
|    Outlet | 4.000 |
| Conveyance fluid | Air |
| Solids mesh size | 4–10 |
| Solids flow rate, lbs./hr | 4,500 |
| Solids vibrational bulk density lb./cu. ft | 46.7 |

Upon depressuring the conveyance fluid from the bottom of the conduit while preventing further introduction of solids thereinto, it was noted that the solids level dropped only 0.25 feet from the solids outlet at the top of the 27.25 foot line indicating an operating solids bulk density of 46.3 pounds per cubic foot during conveyance. This is approximately an 0.85% decrease from the static value and in most cases the decrease is less than 2%.

Thus the operational density of the flowing solids may be determined simply by depressuring the conveyance conduit from the inlet end so as to prevent continued introduction of solids from the induction chamber into the conduit proper and observing the change in position of the solids level at the conduit outlet as was done in obtaining the data above. The operating bulk density of the solids then may be calculated by multiplying the static vibrational bulk density determined as previously described, by the ratio of the volume of that portion of

---

[1] Micromeritics—J M Dalla Valle (1943), p. 105.

the conduit remaining full of solids to the total volume of the conduit.

If more convenient or as a check determination, the operating bulk density may also be determined by depressuring the conduit as above, removing the granular solids from the entire conduit, weighing this material and dividing the weight by the volume of the conduit in question.

Another test for determining whether or not the flowing solids are in substantially compact form consists in observing the change in differential pressure over a selected lenght of the conveyance conduit effected by changing the rate of flow of the conveyance fluid. In fluidized or aerated solids suspensions and the conventional gas lift processes, increases in aeration or conveyance fluid flow decrease the density of the suspension being conveyed and correspondingly decreases this differential pressure while in the method of this invention increases in conveyance fluid flow rate through the compact solids increase the differential pressure markedly. This characteristic distinguishes the compact state of the granular solids flowing according to this invention from dense phase aerated suspensions of solids. For example, in a 140-foot long conduit carrying 500 tons per hour of compact granular cracking catalyst by means of compressed air, the pressure differential is 49.6 pounds per square inch. A 10% increase in the volume of air injected into the inlet of the conduit raises the differential pressure to 60 pounds per square inch. By comparison, a 140-foot conduit conveying 82,200 pounds per hour of 12-30 mesh adsorbent carbon as a dilute suspension in air the pressure differential is 1.12 pounds per square inch and a 10% increase in the air input decreases the pressure differential to 0.99 pounds per square inch. Similarly, in aerated or so-called "fluidized" systems the pressure differential decreases with increase in gas velocity. Thus, it is seen that the magnitude of the pressure differential is on the order of 50 times greater in conveyance of compact solids than in dilute suspensions and in many cases is considerably greater. Furthermore, this pressure differential changes positively (increases) in the conveyance of substantially compact solids and negatively (decreases) in the conveyance of fluidized suspensions of solids with increases in conveyance fluid flow rate.

Still another test for "substantially compact form" involves measuring the pressure drop per unit length along the conduit and calculating the conveyance force ratio therein. This ratio is:

$$\frac{\frac{dp}{dl}}{\rho_s \cos \theta}$$

(the terms of which are given elsewhere herein). Except in relatively rare cases when the operating bulk density is decreased by an amount approaching 20% of the vibrational bulk density $\rho_s$ due to packing rearrangements of the compact solids and the ratio thus determined may be as low as 0.8, the conveyance force ratio as thus calculated exceeds 1.0 for conveyance of substantially compact solids whereas in a conduit carrying an aerated suspension a very considerably lower value of $$\frac{dp}{dl}$$

and a conveyance force ratio well below 1.0 based on the vibrational bulk density is found. Both compact and aerated solids may exist in the same conduit and is a desirable operation in such processes as contact coking wherein the solids increase the size during operation. The increased solids attrition due to the aeration reduces this particle size and may be controlled to balance one effect against the other. In most other cases it is desirable to maintain the entire mass of solids in compact form for minimum energy requirement and solids attrition rate.

Thus in the present invention the granular solids are conveyed in substantially compact form by means of a concurrently depressuring conveyance fluid, if the operating bulk density is not more than 20% less than the static vibrational bulk density, or if there is an increase in pressure differential with increase in fluid flow rate, or if the conveyance force ratio is greater than 1.0.

Each solid particle is continuously in direct contact with several other particles surrounding it and are not free to move relative to them differentiating those conveyance operations in which the solids are aerated, fluidized or otherwise suspended in a fluid and have operating bulk densities always considerably less than 80% of the vibrational or static bulk density.

The solids to inner conduit wall angle of repose $\alpha°$ is defined as the maximum inclination (with respect to a horizontal plane) of a conduit full of granular solids at which the granular solids will not flow therethrough by gravitational forces alone. Gravity flow of solids can occur only when a conduit has an inclination greater than $\alpha°$. In all other flow directions a conveyance force is required to cause motion. Such other flow directions pass through the apex of and are included in the solid angle formed from rotating about a vertical axis the $(90+\alpha)°$ angle struck downward from that axis. The process and apparatus of the present invention is primarily applicable to the conveyance of granular solids in directions included in the solid angle defined above, but it is also applicable though part of the conveyance path is along a direction outside this solid angle.

A particular embodiment of the present invention has been hereinabove described in considerable detail by way of illustration. It should be understood that various other modifications and adaptations thereof may be made by those skilled in this particular art without departing from the spirit and scope of this invention as set forth in the appended claims.

We claim:

1. A method for recirculating granular solids through at least one vessel which comprises passing solids from said vessel into an induction zone, introducing a conveyance fluid thereinto under pressure, depressuring said conveyance fluid concurrently with a compact moving mass of said solids through an elongated conveyance zone provided with at least a primary and a secondary diverging conveyance zone separated by a converging foraminate transition zone, removing part of said conveyance fluid as a plurality of controlled streams at points along the length of said transition zone to maintain a substantially constant pressure gradient therein, restricting the discharge of the compact mass of flowing solids from said conveyance zone to maintain the flowing solids as a dense mass having substantially the solids' static bulk density, and flowing the conveyed solids into a vessel.

2. A method for recirculating granular solids through at least one vessel which comprises passing solids from said vessel into an induction zone, introducing a conveyance fluid thereinto under pressure, depressuring said conveyance fluid concurrently with a compact moving mass of said solids through an elongated conveyance zone provided with at least a primary and a secondary diverging conveyance zone separated by a converging foraminate transition zone, controlling the conveyance fluid flow to maintain a conveyance force ratio $$\frac{\frac{dp}{dl}}{\rho_s \cos \theta}$$

(wherein $$\frac{dp}{dl}$$

is the pressure gradient along the length of the conveyance zone in pounds per square foot per foot, $\rho_s$ is the bulk density of the granular solids in pounds per cubic foot, and $\theta$ is the angular deviation of the conveyance zone from a vertical axis) greater than 1.0 throughout said diverging conveyance zones, withdrawing sufficient partially depressured conveyance fluid as a plurality of streams from a plurality of points along the length of said transition zone to maintain substantially the same constant conveyance force ratio therein and thereby compensate for its convergence, depressuring remaining conveyance fluid concurrently with compact solids through said secondary conveyance zone, restricting the discharge of granular solids therefrom to maintain solids as a dense mass having substantially the solids' static bulk density throughout said elongated conveyance zone, and returning the conveyed solids to said vessel.

3. A method for conveyance of granular solids which comprises depressuring a conveyance fluid under pressure concurrently with compact granular solids through a conveyance zone comprising at least a primary and a second diverging conveyance zone separated by a converging foraminate transition zone, removing a portion of depressuring conveyance fluid as a plurality of controlled streams from a plurality of points along the length of said transition zone to maintain a pressure gradient therein which is substantially constant, and restricting the discharge of granular solids issuing from said conveyance conduit to maintain the moving solids therein as a dense mass having substantially the solids' static bulk density.

4. A method for recirculating granular solids through a vessel which comprises passing solids from said vessel into an induction zone, introducing a conveyance fluid thereinto under pressure, depressuring said conveyance fluid concurrently with a compact moving mass of said solids through an elongated conveyance zone provided with at least a primary and secondary diverging conveyance zone separated by a converging foraminate transition zone, controlling the conveyance fluid flow to maintain a conveyance force ratio $$\frac{\frac{dp}{dl}}{\rho_s \cos \theta}$$

(wherein $$\frac{dp}{dl}$$

is the pressure gradient along the length of the conveyance zone in pounds per square foot per foot, $\rho_s$ is the bulk density of the granular solids in pounds per cubic foot, and $\theta$ is the angular deviation of the conveyance zone from a vertical axis) greater than 1.0 throughout said primary and secondary conveyance zones, withdrawing sufficient partially depressured conveyance fluid as a plurality of individually controlled streams from a plurality of points along the length of said transition zone to maintain a substantially constant conveyance force ratio therein and thereby compensate for its convergence, depressuring remaining conveyance fluid concurrently with compact solids through said secondary conveyance zone, restricting the discharge of granular solids therefrom to maintain solids as a dense mass having substantially the solids' static bulk density throughout said elongated conveyance zone, and returning solids thus conveyed for repassage through said vessel.

5. A method for conveyance of granular solids which comprises passing granular solids and a conveyance fluid under pressure into a conveyance zone comprising a plurality of alternate conveyance and foraminate transition zones, the cross-sectional area of each of said conveyance zones increasing in the direction of flow to maintain a substantially constant pressure gradient therein, the cross-sectional area of said transition zone decreasing in the direction of flow, withdrawing from a plurality of points along the length of each of said transition zones a sufficient quantity of conveyance fluid as a plurality of individually controlled streams to maintain therein substantially the same pressure gradient and to compensate for the areal decrease therein, depressuring the remaining quantity of conveyance fluid and granular solids through the subsequent conveyance zone, and applying a restriction on the mass of solids discharging at the outlet of the last conveyance zone thereby maintaining the moving solids as a mass having the solids' static bulk density throughout the conveyance system.

6. A method for conveyance of granular solids which comprises passing granular solids and a conveyance fluid under pressure into an elongated conveyance system comprising a plurality of alternate diverging conveyance zones and converging foraminate transition zones, depressuring said conveyance fluid concurrently with the solids as a dense mass successively through said conveyance and transition zones, the divergence of said conveyance zones being sufficient to maintain a substantially constant pressure gradient therein, withdrawing from a plurality of fluid removal zones along the length of each of said transition zones a plurality of individually controlled streams of partially depressured conveyance fluid to prevent the increase in pressure gradient therein normally associated with the convergence of said transition zone and maintain substantially the same constant pressure gradient therein as maintained in said conveyance zones, depressuring the remaining portion of conveyance fluid through the next conveyance zone concurrently with said dense mass of solids, and applying a restrictive force to the solids discharging from the outlet opening of the conveyance system to maintain thereby all the granular solids in said conveyance system as a dense mass having substantially the same bulk density as the static bulk density of said solids when at rest.

7. A method according to claim 6 wherein the fluid quantity is controlled by varying the area open to fluid flow from each of said fluid removal zones.

8. A method according to claim 6 wherein the fluid flow quantity is controlled by varying the pressure drop existing across the area open for fluid flow from each of said fluid removal zones.

9. A method according to claim 6 in combination with the steps of repressuring the partially depressured conveyance fluid removed from the fluid removal zones, and introducing it into the entrance of the conveyance system.

10. An apparatus for the circulation of granular solids through a fluid-solids contacting vessel or other vessel which comprises in combination with said vessel, an outlet conduit for solids from the bottom thereof opening into an induction chamber, an inlet conduit thereinto for a conveyance fluid, an elongated diverging primary conveyance conduit opening from said induction chamber and communicating through a foraminate converging transition section with an elongated diverging secondary conveyance conduit, means for passing solids discharged from said last-named conduit back into said vessel, a transition section chamber enclosing said transition section, at least one outlet therefrom for conveyance fluid withdrawn through the openings in said transition section, and means for restricting the discharge of granular solids from said secondary conveyance conduit to maintain all the solids in the apparatus during conveyance in substantially compact form.

11. An apparatus according to claim 10 in combination with fluid pressuring means receiving fluid from said transition section chamber and a conduit from said pressuring means for repressured fluid opening into said induction chamber.

12. An apparatus for recirculation of granular solids through a fluid-solids contacting vessel which comprises in combination with a fluid-solids contacting vessel, an outlet for solids from the bottom thereof opening into an induction chamber, an inlet thereinto for a conveyance fluid under pressure, an elongated conveyance conduit comprising at least a primary diverging conveyance conduit opening from said induction chamber and through a foraminate converging transition section into and through a diverging secondary conveyance conduit, a fluid-tight chamber surrounding said transition section for receiving fluids therefrom, the cross-sectional area of said primary and secondary conveyance conduits increasing in the flow direction to maintain a substantially constant conveyance force ratio $$\frac{\frac{dp}{dl}}{\rho_s \cos \theta}$$

(wherein $$\frac{dp}{dl}$$

is the pressure gradient along the length of the conveyance zone in pounds per square foot per foot, $\rho_s$ is the bulk density of the granular solids in pounds per cubic foot, and $\theta$ is the angular deviation of the conveyance zone from a vertical axis) greater than 1.0 therein, said transition section decreasing in cross-sectional area from that of the primary conveyance conduit outlet to that of the secondary conveyance conduit entrance, at least one outlet conduit for conveyance fluid from said chamber, means for maintaining said solids during conveyance in substantially compact form, and a conduit for transfer of conveyed solids from the outlet of said conveyance to the top of said vessel.

13. An apparatus for the conveyance of granular solids which comprises an elongated conduit comprising coaxially aligned alternate diverging conveyance conduits and converging transition sections, a conveyance fluid accumulation chamber surrounding each of said transition sections, means for introducing granular solids and a conveyance fluid under pressure into the entrance of said elongated conveyance conduit, means for receiving solids and depressured conveyance fluid from the outlet of said elongated conveyance conduit, each of said transition sections having a plurality of openings for partially depressured conveyance fluid disposed along the length thereof, means for controlling the quantity of partially depressured conveyance fluid removed from the various openings to maintain a substantially constant conveyance force ratio $$\frac{\frac{dp}{dl}}{\rho_s \cos \theta}$$

(wherein $$\frac{dp}{dl}$$

is the pressure gradient along the length of the conveyance zone in pounds per square foot per foot, $\rho_s$ is the bulk density of the granular solids in pounds per cubic foot, and $\theta$ is the angular deviation of the conveyance zone from a vertical axis) at a value greater than 1.0 throughout said transition sections to compensate for the convergence, an outlet conduit for partially depressured conveyance fluid from each of said accumulation chambers, and means for maintaining said solids in substantially compact form during conveyance.

14. An apparatus for the conveyance of granular solids which comprises an elongated conduit comprising alternate diverging conveyance conduits and converging transition sections, a conveyance fluid accumulation chamber surrounding each of said transition sections, means for introducing granular solids and a conveyance fluid under pressure into the entrance of said elongated conveyance conduit, means for receiving solids and depressured conveyance fluid from the outlet of said elongated conveyance conduit, each of said convergent transition sections being provided with a plurality of longitudinal slots arranged peripherally in sets along the length thereof, said slots having an outside to inside width ratio of between 1.25 and 3.0, the ratio of the inside width to the diameter of the smallest particle desirably retained within the transition section being between 0.1 and 0.75, means for controlling the quantity of partially depressured conveyance fluid removed from the various openings of said converging transition sections to maintain a substantially constant conveyance force ratio $$\frac{\frac{dp}{dl}}{\rho_s \cos \theta}$$

(wherein $$\frac{dp}{dl}$$

is the pressure gradient along the length of the conveyance zone in pounds per square foot per foot, $\rho_s$ is the bulk density of the graular solids in pounds per cubic foot, and $\theta$ is the angular deviation of the conveyance zone from a vertical axis) at a value greater than 1.0 throughout said transition sections to compensate for the convergence, an outlet conduit for partially depressured conveyance fluid from each of said accumulation chambers, and means for maintaining said solids in substantially compact form during conveyance.

15. An apparatus for the conveyance of granular solids which comprises an elongated conduit comprising alternate diverging conveyance conduits and converging transition sections, a conveyance fluid accumulation chamber surrounding each of said transition sections, means for introducing granular solids and a conveyance fluid under pressure into the entrance of said elongated conveyance conduit, means for receiving solids and depressured conveyance fluid from the outlet of said elongated conveyance conduit, each of said convergent transition sections being provided with openings in the wall thereof and arranged in sets peripherally along the length thereof, each set opening from a fluid removal zone within said transition section, baffles filling the annular volume around said transition section within said chamber and disposed between each set of openings forming a fluid removal chamber in communication with each set of openings, an outlet conduit for partially depressured conveyance fluid and solids fines from each of said removal chambers, an automatic control valve in each of said outlet conduits, and means for maintaining said granular solids in substantially compact form during conveyance.

16. An apparatus according to claim 15 in combination with a pair of pressure taps embracing each fluid removal zone, a differential pressure control instrument connected to each pair of said pressure taps and actuated by the differential pressure existing therebetween, said instrument operating said automatic control valve in the outlet conduit removing partially depressured conveyance fluid from the fluid accumulation chamber communicating with said fluid removal zone.

17. An apparatus for the conveyance of granular solids which comprises an elongated conduit comprising alternate diverging conveyance conduits and converging transition sections, a conveyance fluid accumulation chamber surrounding each of said transition sections, means for introducing granular solids and a conveyance fluid under pressure into the entrance of said elongated conveyance conduit, means for receiving solids and depressured conveyance fluid from the outlet of said elongated conveyance conduit, each of said convergent transition sections being provided with openings in the wall thereof and arranged in sets peripherally along the length thereof, each set opening from a fluid removal zone within said transition section, a rotatable collar provided with openings therein and adapted to cover and uncover said openings in each set thereof, means for supporting each of said rotatable collars, means for rotating said collars to vary the quantity of partially depressured conveyance fluid flowing from each of said fluid removal zones into said fluid accumulation chamber, an outlet conduit for fluid from said accumulation chamber, means for removing solids fines therefrom, and means for maintaining the solids in substantially compact form during conveyance.

18. An apparatus according to claim 15 in combination with a pair of pressure taps embracing each fluid removal zone, a differential pressure control instrument connected to each pair of said pressure taps and actuated by the differential pressure existing therebetween, said instrument being adapted to change the rotative position of the rotatable collar positioned around the particular fluid removal zone and thereby control the removal of conveyance fluid therefrom.

19. An apparatus according to claim 17 wherein said openings in said rotatable collars are triangular-shaped openings whereby rotation of said rotatable collar exposes a variable area of the opening through the wall of said transition section for fluid flow therethrough.

20. An apparatus according to claim 17 wherein said rotatable collar comprises at least 2 semi-circular sections linked together by connecting rods and expansion springs whereby said collars are adapted to expand as thermal expansion of the transition section occurs.

21. An apparatus for the conveyance of granular solids which comprises an elongated conduit comprising alternate diverging conveyance conduits and converging transition sections, a conveyance fluid accumulation chamber surrounding each of said transition sections, means for introducing granular solids and a conveyance fluid under pressure into the entrance of said elongated conveyance conduit, means for receiving solids and depressured conveyance fluid from the outlet of said elongated conveyance conduit, each of said convergent transition sections being provided with openings in the wall thereof and arranged in sets peripherally along the length thereof, each set opening from a fluid removal zone within said transition section, means for removing fluid from each of said accumulation chambers while maintaining a constant back pressure therein, each successive set of openings in the direction of solids flow having a greater area open to fluid flow than the previous set for withdrawal of partially depressured conveyance fluid at the differential pressure existing between each fluid removal zone and said accumulation zone, means for removing solids fines from said accumulation chamber, and means for maintaining said solids during conveyance in substantially compact form.

22. An apparatus for the conveyance of granular solids which comprises an elongated conduit comprising a plurality of axially aligned alternate diverging conveyance conduits and converging transition sections, a conveyance fluid accumulation chamber surrounding each of said transition sections, means for introducing granular solids and a conveyance fluid under pressure into the entrance of said elongated conveyance conduit, means for receiving solids and depressured conveyance fluid from the outlet of said elongated conveyance conduit, each of said convergent transition sections being provided with openings in the wall thereof and arranged in peripheral sets along the length thereof, each set opening from a fluid removal zone within said transition section, an outlet conduit for partially depressured conveyance fluid from said accumulation chamber, means for maintaining a substantially constant fluid pressure therein which is less than the minimum conveyance fluid pressure existing within the transition section communicating therewith, the cross-sectional area of each set of slots being proportioned to permit the withdrawal of sufficient conveyance fluid from each of said fluid removal zones at the particular differential pressure existing to establish a substantially constant pressure gradient throughout the transition section which is substantially the same as that maintained in said conveyance conduits, means for removing solids fines from said accumulation chambers, and means for maintaining said solids during conveyance in substantially compact form.

References Cited in the file of this patent

UNITED STATES PATENTS

| 494,274 | Kelley | Mar. 28, 1893 |
| 727,030 | Tilghman | May 5, 1903 |
| 1,032,115 | Cook | July 9, 1912 |
| 1,597,438 | Ennis | Aug. 24, 1924 |
| 2,493,911 | Brandt | Jan. 10, 1950 |
| 2,509,983 | Morrow | May 30, 1950 |
| 2,541,077 | Leffer | Feb. 13, 1951 |
| 2,693,395 | Berg | Nov. 2, 1954 |

FOREIGN PATENTS

| 180,397 | Great Britain | May 11, 1922 |